Feb. 23, 1932. B. C. ROCKWELL 1,846,658
FLOORING
Filed Feb. 1, 1930 2 Sheets-Sheet 1
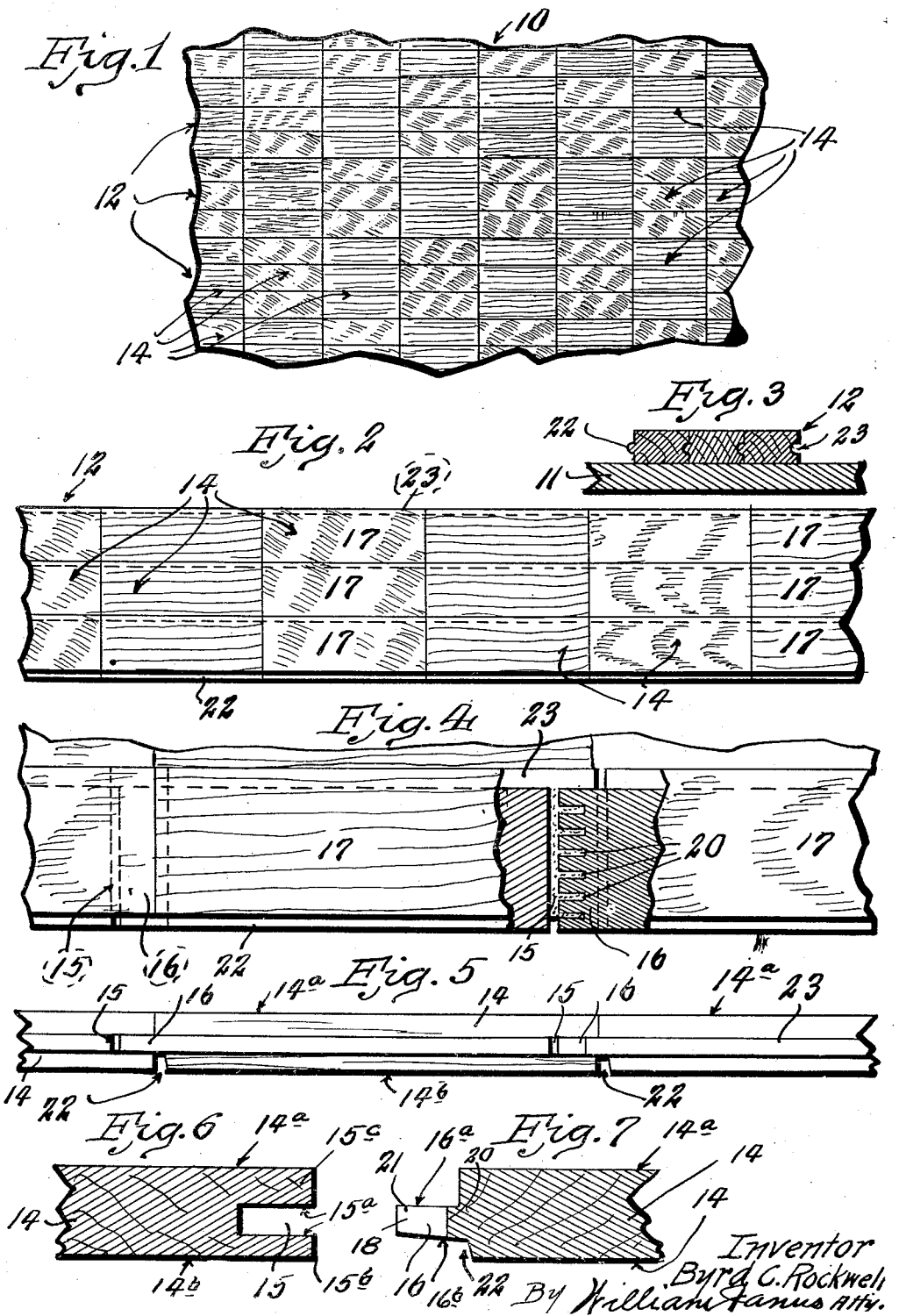

Feb. 23, 1932. B. C. ROCKWELL 1,846,658
FLOORING
Filed Feb. 1, 1930 2 Sheets-Sheet 2
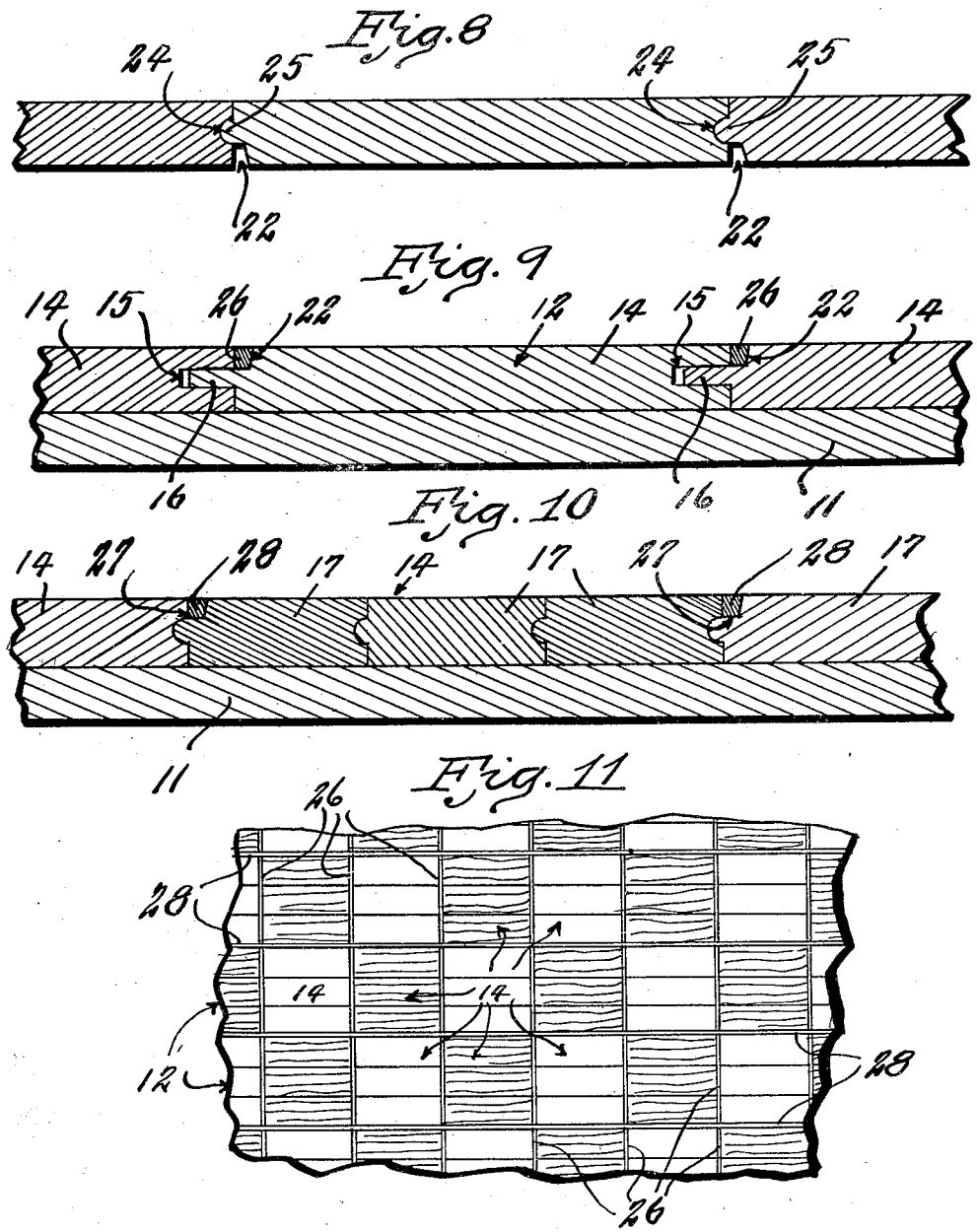
Inventor
Byrd C. Rockwell Patented Feb. 23, 1932

1,846,658

UNITED STATES PATENT OFFICE

BYRD C. ROCKWELL, OF CAMDEN, ARKANSAS

FLOORING

Application filed February 1, 1930. Serial No. 425,108.

This invention relates to new and useful improvements in block flooring and to a novel method of manufacturing the same.

Floor blocks in present practice are edge-grouped or assembled and are installed in contrast grain to form the ornamental effect. Standard floor blocks now in use are approximately 6 x 6, 8 x 8, 10 x 10, and 12 x 12 in size. The laying of the blocks is difficult and expensive and requires skilled workmen. This method is also wasteful as it calls for high grade lumber of the required width which is then cut into suitable short lengths.

The object of the present invention is to provide a novel method of manufacturing flooring material whereby short lengths of flooring stock can be joined together to form flooring strips of the desired room length, whereby such strip can be trimmed and finished at the factory so that no further operation is required on the job except to lay and nail the strip in position. Thus short lengths of stock are utilized to form the strips and as the strips are of the required length no expert work is required on the job and such flooring can be laid by unskilled workmen.

Other objects of the invention are to provide flooring strips of predetermined room lengths and consisting of a plurality of short lengths of material having their ends joined together by means of a novel mortise and tenon glue joint which is highly efficient and rigidly holds the parts in assembled relation, particularly when the flooring strip is passed through the flooring matcher.

Other objects of the invention are to form the alternate sections of each strip of contrast wood (for instance, white and red oak) with the grain running in the same direction, and to assemble together a plurality of such strips with the like sections adjoining each other so as to provide block effect of contrast wood.

Further objects of my invention are to provide a novel mortise and tenon joint for end-grouping a plurality of short sections of high grade flooring material to form flooring strips of the desired room lengths, said mortise and tenon joint being of sufficient strength to permit working operations on the assembled strip, such as running through the flooring matcher, so that said assembled strip can be finished at the factory and can be assembled with other strips of like proportions and woods to provide block flooring of suitable sizes.

Still further objects of the invention are to provide block flooring material, assembled in strips of suitable room lengths, each block comprising a series of strips of short length end-grouped by means of a novel mortise and tenon joint with the ends of adjoining blocks and preferably of contrast wood and to match both faces of such block material so that either face can be used, provision being made in one of the faces for the reception of suitable inlay strips of contrast material.

Additional objects of my invention are to provide a novel method of end-grouping or assembling strips of various predetermined lengths by means of a novel mortise and tenon joint to form strips of the desired room lengths whereby the finished block strips can be economically manufactured from short lengths of lumber of high grade and whereby such strips can be stocked by dealers and can be sold and installed in competition with the high grade hard wood strip flooring, said strips being adapted to be arranged in assembled relation to provide any desired ornamental effect, such as blocks or squares of contrast wood or oblong or brick pattern effects or other ornamental designs.

With these and other objects in view, my invention consists in certain novel features of construction and arrangement of parts hereinafter more fully described and claimed, and illustrated in the accompanying drawings, in which—

Figure 1 is a fragmental top plan view of a floor made from my improved flooring material in accordance with my method.

Figure 2 is a fragmental top plan view of one of the block strips.

Figure 3 is a transverse cross section through said block strip.

Figure 4 is a fragmental enlarged top plan view of one of the strips utilized in the assembly of the block strip.

Figure 5 is a side elevation, partly in cross section, of the strip shown in Figure 4.

Figure 6 is an enlarged sectional view of the mortise end of one of the strip sections.

Figure 7 is a similar view of the tenon end of one of said strip sections.

Figure 8 is a longitudinal cross section showing a modified form of construction.

Figure 9 is a longitudinal cross section of a construction shown in the preceding figures, but in a reverse position and with the inlay strip of contrast material interposed between the ends of the corresponding strip sections.

Figure 10 is a vertical cross section through a floor showing inlay strips interposed between the longitudinal edges of the corresponding block strip assemblies.

Figure 11 is a fragmental top plan view of a floor built of strips disclosed in Figures 9 and 10.

The standard hardwood flooring is made of strips of standard lengths and is cut on the job as required. This procedure not only requires high grade lumber of commercial lengths but also results in a great deal of waste of high grade lumber both in the manufacture of the flooring and in the laying thereof.

Where floor blocks are used, these are made from hardwood flooring strips of standard widths (1½ inches, 2 inches, and 2¼ inches wide on face side). The width of flooring strip used depends upon the size of the block desired and the number of strips used to make the floor, three, four and five strips being commonly used. Thus to form a block six inches square, three strips of two inch material are used. The strips are assembled edgewise to provide material of proper width, in the present instance six inches, and are secured together in any suitable manner, such as splines, dowels, and the like. Strips are generally cut to length before side grouping. Some blocks have all four edges grooved and others have tongue and groove engagement on the outer edges.

In laying and finishing a block flooring of this type, expert floor layers or workmen are required and the expense is a great deal more than the cost of a regular hardwood floor of strip material.

My invention contemplates the grouping of blocks or short lengths of strips of high grade material through end connections instead of side grouping and building these groups or block strips into the desired room lengths during the manufacture thereof so that the completed block strips can be stained and waxed or varnished at the factory and no operations are required on the job with the exception of laying and nailing the strips. These features are of great advantage not only to the manufacturer but also to the dealer and contractor.

Blocks end-assembled in this manner lay as easily as common flooring strips and in the same manner. Any carpenter can lay the assembled block strips and the danger of having improperly joined blocks is reduced to minimum. Also by means of my improved method the short lengths of high grade material heretofore regarded as waste can be utilized in the manufacture of the block strips, thereby considerably reducing the cost of this type of flooring and enabling it to compete successfully with the standard flooring.

Referring by numerals to the accompanying drawings, 10 indicates a floor built in accordance with my invention and 11 indicates the sub-floor. The floor 10 comprises a plurality of block strips 12 which are delivered to the job finished and stained and varnished or waxed and cut to the proper length. Each flooring strip 12 consists of a series of square or block sections 14 which are end-grouped by means of a mortise 15 and a tenon 16 to form the block strips of suitable lengths.

Blocks 14, preferably are formed of a series of short pieces 17 of flooring material assembled edgewise to form blocks of desired sizes. Thus when a block 6 x 6 is desired, three pieces 17 of two inch stock are cut to proper lengths and are then assembled edgewise to form the block.

In cutting the pieces 17 to predetermined lengths, allowance is made for the tenon 16 on one end of the block. One end of each block is then machined to provide the mortise 15 and the other end of said block is machined to provide the tenon 16. It is to be noted that the mortise 15 has the walls 15$^a$ disposed parallel with each other and with the faces 14$^a$ and 14$^b$ of the block 15. Also said mortise 15 and tenon 16 are disposed closer to face 14$^b$, thereby making the lower portion 15$^b$ thinner than the upper portion 15$^c$. The tenon 16 is shorter than the depth of mortise 15 so that when said parts are in assembled relation there is a clearance between the end of the tenon and the end wall of the mortise. The upper face 16$^a$ of each tenon is formed substantially parallel with the faces of the block while the underside 16$^b$ is slightly inclined from horizontal so that the entering end 18 of the tenon is substantially of the same thickness as the width of the mortise, while the shoulder of the tenon 20 is slightly wider than said mortise. This insures a "squeeze" or secure seating of the tenon in the mortise whereby the two sections are firmly joined together.

In view of the snug assembly of the mortise and tenon there is a possibility that an insufficient amount of glue would be provided to form a strong glue joint between the parts. To obviate this objection, the tenon 16 is relished as indicated at 21, the saw cuts terminating short of the body portion in order not to disturb the faces of the block, and said cuts being disposed vertically and spaced from each other throughout the entire width of the tenon. The glue enters these cuts 21 and thus a sufficient glue surface is provided for engagement of the tenon with the walls of the mortise.

A sufficient number of blocks 14 is end-grouped to provide a block strip 12 of the desired length. After the glue joints are set, each strip 12 is run through a matcher to provide the respective longitudinal edges of the strip with a tongue 22 and a groove 23, by means of which the block strips 12 are laid in the same manner as the ordinary strip flooring. Since the blocks 14 are all of the same dimensions and of the same lengths, the block strips 12 when laid have their respective blocks lined up longitudinally and transversely. In laying the block strips 12 it is only necessary to take care to align each block strip 12 with the adjacent block strips, and to arrange the contrast block to produce the desired ornamental pattern. The contrast effect of the blocks can be produced in a number of ways; for instance, blocks of the same kind of wood can be stained in different shades or colors; or different species of wood can be used (red and white oak); or blocks of different woods can be used (white oak and fir); or other combinations can be designed. However, in all arrangements the grain of all of the blocks runs in the same direction. The relishing of the tenons of the blocks insures an ample supply of glue to the assembled parts and provides a strong glue joint.

As the tenon is shorter than the depth of the mortise and the lower face of the block is cut away adjacent to the tenon, it is obvious that the upper faces of the blocks, when assembled, form a perfect joint.

In the modified form shown in Figure 8 the ends of the blocks are provided with a groove 24 and a tongue 25, respectively, for end-grouping said block members.

In Figure 9 a block strip is shown in reversed position with the face 14ᵇ presented upwardly and with an inlay tongue 26 arranged in the transversely disposed grooves 22. This arrangement can be used when it is desired to form the floor with inlay strips as shown in Figure 11.

Figure 10 is a cross section taken at right angles to Figure 9 and showing longitudinally disposed grooves 29 arranged adjacent to each block 14. A longitudinally disposed inlay strip 28 is arranged in each groove 27. The inlay strips can be nailed or glued in position.

Thus by means of my improved block strip 12 a floor can be laid either without inlay strips as shown in Figure 1, or with inlay strips as shown in Figure 11, as desired. As each block strip 12 is finished on both faces it can be readily used in laying either floor without requiring any additional operations upon the strip. This permits greater selection of the ornamental floor effects without increasing the amount of flooring material to be carried in stock.

Waxing, or varnishing, or otherwise finishing the block strips at the factory, permits the work to be done efficiently and economically. This not only reduces the ultimate cost of the floor of this type but permits the laying thereof with greater speed.

The provision of mortise and tenon joint permits the use of blocks of various lengths and woods so that any ornamental effect desired can be obtained. The vertical slots 20 formed in the tenon 11 and spaced transversely thereof provide pockets for receiving and retaining glue during the assembly of the tenon in the mortise, so that ample glue surface is assured between said mortise and tenon.

Obviously various changes can be made in my improved block flooring without departing from the spirit of my invention.

I claim:

1. In a mortise and tenon construction, a short section of material cut to a predetermined length and provided on one end with a mortise disposed transversely and at right angle to the longitudinal axis of said section and having parallel top and bottom walls, said section of material being provided on the other end with a tenon having its top face formed parallel with said walls of said mortise and having the underside disposed obliquely to said top face whereby said tenon at the shoulder is of greater thickness than its point and than said mortise, said tenon being adapted to be forced under pressure into the mortise of the adjacent section, the face of the shoulder adjacent to said obliquely disposed underside of said mortise being offset inwardly with respect to the face of the shoulder adjacent to the upper side of said tenon, thereby insuring accurate meeting line between the upper faces of the abutting sections of material.

2. In an end joint construction of the class described, a short section of material cut to a predetermined length and provided on one end with a horizontally disposed mortise having parallel top and bottom walls and provided on the other end with a tenon having its top face formed parallel with said walls of said mortise and having the underside disposed obliquely to said top face whereby said tenon at the shoulder is of greater thickness than its point and than said mortise, said tenon being adapted to be forced under end pressure into the mortise of the adjacent section, said tenon being formed with transversely spaced vertically disposed slots for receiving glue to increase the glue surface contact between said tenon and the corresponding mortise, one of the end walls of the lower half of the section being undercut to provide suitable clearance between the abutting lower halves of the sections and to insure an accurate joint between the upper halves thereof.

3. In a mortise and tenon construction, a member having a slip mortise at one end, said mortise having spaced parallel walls, and a member having a tenon end, the point of said tenon being of the same thickness as the space between said walls of said mortise; said tenon having its underside slightly tapered throughout its entire length from point to shoulder, said tenon adjacent to said shoulder being slightly thicker than said point, the upper and lower halves of the end wall of one of said members being disposed on different vertical planes relatively to each other to insure a perfect meeting line between the faces of the adjoining members.

4. In a mortise and tenon construction, a member having a slip mortise at one end, said mortise having spaced parallel walls, and a member having a tenon at one end, the point of said tenon being of substantially same thickness as the distance between said spaced mortise walls, said tenon having one face parallel with said mortise walls and having its other face inclined from horizontal whereby said tenon is slightly thicker adjacent to its shoulder than at its point, there being a plurality of vertically disposed slots provided in said tenon, spaced transversely thereof, whereby glue is received in said slots and a sufficient glue surface contact provided between said mortise and said tenon.

In testimony whereof I hereunto affix my signature this 27th day of January, 1930.

BYRD C. ROCKWELL.